United States Patent
Nishio et al.

(10) Patent No.: US 10,030,970 B2
(45) Date of Patent: Jul. 24, 2018

(54) IMAGE MEASURING APPARATUS AND MEASURING APPARATUS

(71) Applicant: MITUTOYO CORPORATION, Kanagawa (JP)

(72) Inventors: Yukimasa Nishio, Kawasaki (JP); Toshikazu Iwata, Yamato (JP); Eisuke Moriuchi, Kawasaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 271 days.

(21) Appl. No.: 14/947,368

(22) Filed: Nov. 20, 2015

(65) Prior Publication Data
US 2016/0146594 A1   May 26, 2016

(30) Foreign Application Priority Data

Nov. 26, 2014 (JP) ................. 2014-238666

(51) Int. Cl.
  *G01B 11/25* (2006.01)
  *G01B 21/04* (2006.01)
(52) U.S. Cl.
  CPC ............ *G01B 11/25* (2013.01); *G01B 21/047* (2013.01)
(58) Field of Classification Search
  CPC ............................. G01B 11/25; G01B 21/047
  See application file for complete search history.

(56) References Cited

U.S. PATENT DOCUMENTS

| 2005/0264777 A1* | 12/2005 | Gardner | G03F 7/70275 355/53 |
| 2012/0126146 A1* | 5/2012 | Kaneko | G01N 1/286 250/492.3 |
| 2014/0071459 A1* | 3/2014 | Nakatsukasa | G01B 11/25 356/611 |

FOREIGN PATENT DOCUMENTS

JP   H11-351824 A   12/1999

OTHER PUBLICATIONS

U.S. Appl. No. 14/947,401 to Eisuke Moriuchi et al., which was filed on Nov. 20, 2015.

* cited by examiner

*Primary Examiner* — Behrooz Senfi
(74) *Attorney, Agent, or Firm* — Greenblum & Bernstein, P.L.C.

(57) ABSTRACT

An image measuring apparatus includes a sample stage having a placement surface on which an object to be measured is placed; an image capture apparatus facing the placement surface of the sample stage and capturing an image of the object to be measured; and a pattern projection apparatus projecting a predetermined pattern onto the sample stage, the predetermined pattern providing a reference for at least one of a placement position and direction of the object to be measured on the placement surface.

13 Claims, 10 Drawing Sheets

IMAGE MEASURING APPARATUS AND MEASURING APPARATUS

CROSS-REFERENCE TO RELATED APPLICATIONS

The present application claims priority under 35 U.S.C. § 119 of Japanese Application No. 2014-238666, filed on Nov. 26, 2014, the disclosure of which is expressly incorporated by reference herein in its entirety.

BACKGROUND OF THE INVENTION

1. Field of the Invention

The present invention relates to an image measuring apparatus capturing an image of a measured object using an image capture apparatus, and to a measuring apparatus measuring a shape of the measured object by another method.

2. Description of Related Art

An image measuring apparatus capturing an image of a measured object using an image capture apparatus, and a measuring apparatus measuring a shape of the measured object by another method are known. When using such an image measuring apparatus and measuring apparatus, the measured object is placed on a sample stage. In order to perform highly accurate image measurement, it is extremely important to accurately position the measured object, and so as to be parallel, with respect to a reference axis of a placement surface.

Patent Literature 1: Japanese Patent Laid-open Publication No. H11-351824

However, in a conventional measuring apparatus, positioning a measured object on a placement surface or correcting parallelism of the measured object requires experience, and these adjustment tasks take up a great deal of time and effort.

SUMMARY OF THE INVENTION

The present invention was conceived in view of these circumstances, and provides an image measuring apparatus and measuring apparatus capable of readily performing positioning and parallelism correction of a measured object (i.e., an object to be measured) with respect to a placement stage.

An image measuring apparatus according to the present invention includes a sample stage having a placement surface on which a measured object is placed; an image capture apparatus facing the placement surface of the sample stage and capturing an image of the measured object; and a pattern projection apparatus projecting a predetermined pattern onto the sample stage, the predetermined pattern providing a reference for at least one of a placement position and direction of the measured object on the placement surface.

In other words, in a case using the image measuring apparatus according to the present invention, the predetermined pattern is projected onto the sample stage and at least one of the placement position and direction of the measured object is adjusted with reference to the predetermined pattern. Accordingly, positioning and correcting parallelism of the measured object can be readily performed.

In the image measuring apparatus according to another aspect of the present invention, the pattern projection apparatus includes a mask displaying the predetermined pattern; a light source emitting light onto the mask; and a projection optical system projecting the light emitted from the light source and through the mask onto the sample stage. In the image measuring apparatus according to this aspect, by switching the mask, for example, a different pattern can be projected onto the sample stage in response to the measured object.

In addition, the pattern projection apparatus may also include a keystone corrector performing keystone correction of the predetermined pattern projected onto the placement surface. Also, the mask may be positioned so as to be generally parallel to the placement surface. In other words, the mask may be exactly parallel or slightly parallel to the placement surface.

In the image measuring apparatus according to another aspect of the present invention, the pattern projection apparatus further includes a pattern generating device generating the predetermined pattern based on input image data; a light source emitting light onto the pattern generating device; and a projection optical system projecting the light emitted from the light source and through the pattern generating device onto the sample stage. In the image measuring apparatus according to this aspect, by inputting different image data to the pattern generating device, for example, a different pattern can be projected onto the sample stage in response to the measured object.

In the image measuring apparatus according to another aspect of the present invention, an image capture direction of the image capture apparatus is generally perpendicular with respect to the placement surface of the sample stage. In other words, the image capture direction of the image capture apparatus may be exactly perpendicular or slightly perpendicular with respect to the placement surface of the sample stage.

The pattern projection apparatus is positioned on the same side of the sample stage as the placement surface and projects the predetermined pattern onto the sample stage from a direction other than the image capture direction of the image capture apparatus.

In a case where the pattern projection apparatus is provided on the placement surface side of the sample stage, by providing the image capture apparatus in a vicinity of the pattern projection apparatus rather than on a rear side (opposite side) of the sample stage, dead space can be effectively utilized, and the overall image measuring apparatus can be configured compactly. In addition, in a case where the image capture direction of the image capture apparatus is generally perpendicular with respect to the placement surface of the sample stage, and the pattern projection apparatus projects the predetermined pattern at the sample stage from a direction other than the image capture direction of the image capture apparatus, the predetermined pattern is projected from obliquely above with respect to the sample stage. Accordingly, the predetermined pattern can be more favorably projected even onto portions on a boundary between the placement surface of the sample stage and a side surface of the measured object, and positioning and parallelism correction of the measured object can be performed with still more accuracy.

In the image measuring apparatus according to another aspect of the present invention, an image capture direction of the image capture apparatus is generally perpendicular with respect to the placement surface of the sample stage. The pattern projection apparatus is positioned on the same side of the sample stage as the placement surface and projects the predetermined pattern from the same general direction as the image capture direction of the image capture apparatus.

As noted above, in the case where the pattern projection apparatus is provided on the same side of the sample stage as the image capture apparatus, dead space can be effectively utilized, and the overall image measuring apparatus can be configured compactly. In addition, the predetermined pattern is projected from a direction generally perpendicular to the sample stage. Therefore, keystone correction of the predetermined pattern can be omitted and the configuration of the optical system can be simplified.

In the image measuring apparatus according to another aspect of the present invention, the pattern projection apparatus is positioned on an opposite side of the sample stage from the placement surface side, and projects the predetermined pattern onto the sample stage from the opposite side surface of the sample stage.

In a case where the pattern projection apparatus is positioned on the same side of the sample stage as the placement surface, the pattern may be blocked by the measured object, tweezers, or the like and a portion of the pattern may not be projected onto the sample stage. In this example, in a case where the pattern projection apparatus is positioned on the opposite side of the sample stage from the placement surface and the predetermined pattern is projected onto the sample stage from the opposite side surface of the sample stage, positioning and parallelism correction of the measured object can be favorably performed without a portion of the pattern being blocked.

A measuring apparatus according to the present invention includes a sample stage having a placement surface on which a measured object is placed; a measuring mechanism measuring a shape of the measured object placed on the placement surface of the sample stage; and a pattern projection apparatus projecting a predetermined pattern onto the sample stage, the predetermined pattern providing a reference for at least one of a placement position and direction of the measured object on the placement surface.

According to the present invention, an image measuring apparatus and measuring apparatus can be provided that are capable of readily performing positioning and parallelism correction of a measured object.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Configuration of Image Measuring Apparatus in First Embodiment

Figure 1:
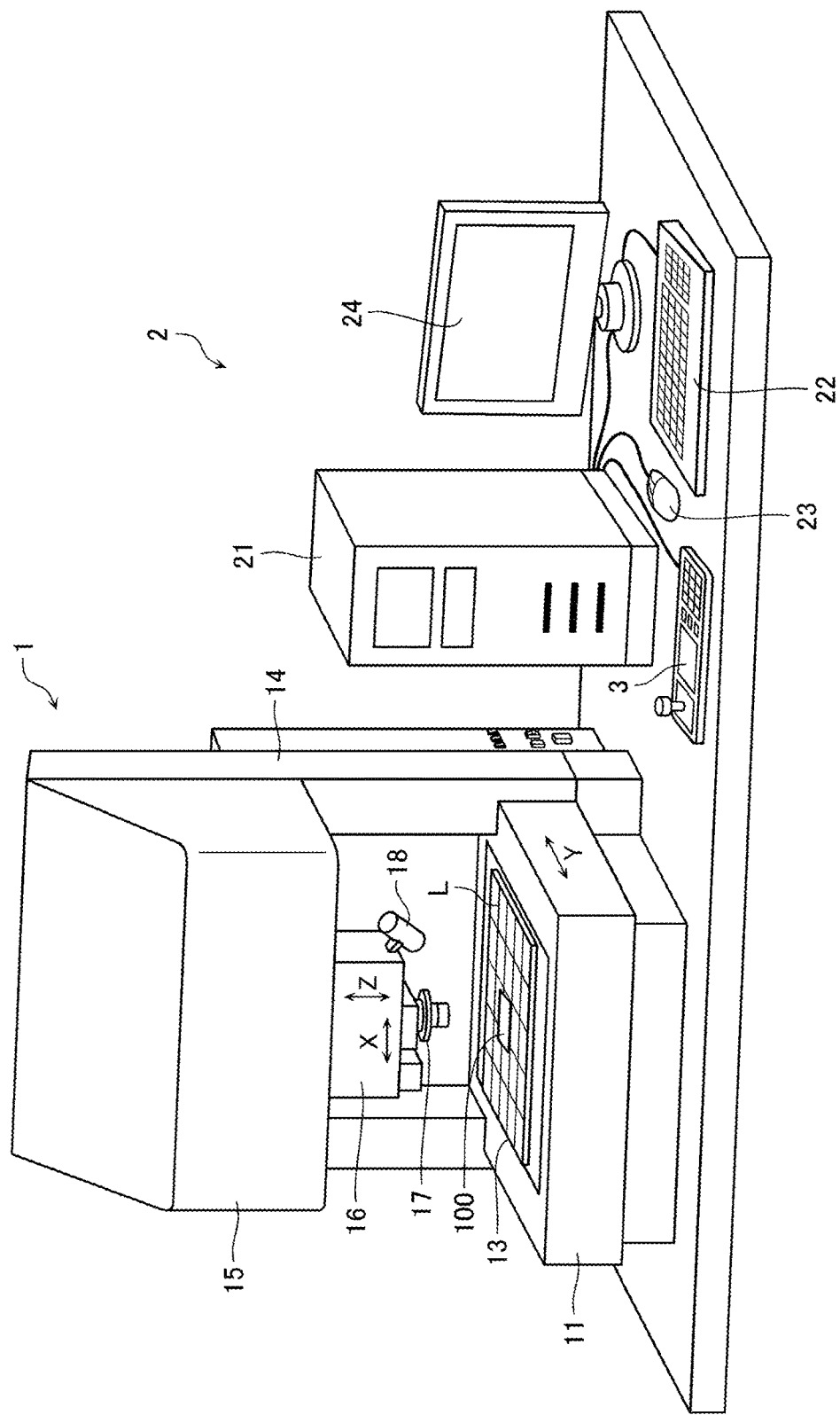
FIG. 1 is an overall view of an image measuring system that includes an image measuring apparatus according to a first embodiment.
Figure 2:
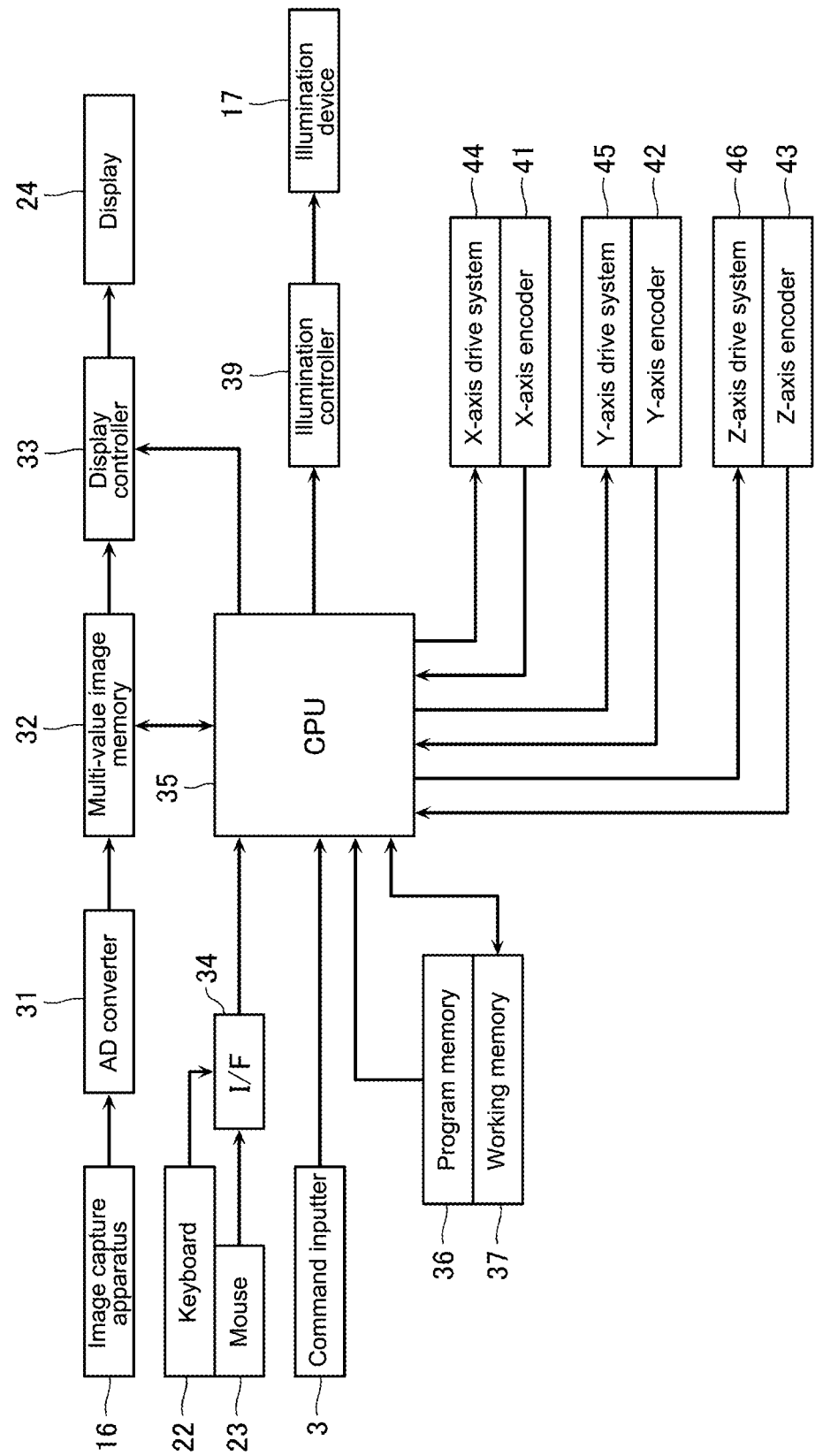
FIG. 2 is a functional block diagram illustrating a configuration of the image measuring system.

Next, an image measuring apparatus according to a first embodiment of the present invention is described in detail with reference to the drawings. FIG. 1 is an overall view of an image measuring system that includes an image measuring apparatus 1 according to the present embodiment. FIG. 2 is a functional block diagram illustrating a configuration of the image measuring system according to the present embodiment.

The image measuring system according to the present embodiment includes the image measuring apparatus 1, which captures an image of a measured object 100; a computer system 2, which performs drive control of the image measuring apparatus 1 and executes necessary measurement data processing; and a command inputter 3, which enables manual operation of the image measuring apparatus 1.

The image measuring apparatus 1 is configured as follows. Specifically, the measured object 100 is placed on a sample stage 13, which is mounted on a table 11 and is driven in a Y-axis direction by a Y-axis drive mechanism (not shown in the drawings). A frame 14 extending upward is fixated on a rear end portion of the table 11, and a cover 15 protrudes from a front surface on an upper portion of the frame 14. An image capture apparatus 16 is provided on an interior of the cover 15, the image capture apparatus 16 being driven by X-axis and Z-axis drive mechanisms (not shown in the drawings) so as to view the sample stage 13 from above. An image capture direction of the image capture apparatus 16 is generally perpendicular with respect to a placement surface of the sample stage 13. A ring-shaped illumination device 17 emitting an illuminating light at the measured object 100 is provided proximate to a bottom end of the image capture apparatus 16.

In addition, a pattern projection apparatus 18 is mounted on the image capture apparatus 16, the pattern projection apparatus 18 projecting a predetermined pattern L capable of comparing at least one of a position and a direction of the measured object 100 on the placement surface of the sample stage 13. The pattern projection apparatus 18 is positioned on the same side of the sample stage 13 as the placement surface and projects the predetermined pattern L from a direction other than an image capture direction of the image capture apparatus 16. In the present embodiment, the predetermined pattern L is projected from a near side toward a far side. Moreover, although the pattern projection apparatus 18 is mounted to the image capture apparatus 16 in the present embodiment, the pattern projection apparatus 18 may also be mounted to a different portion.

In the present embodiment, the sample stage 13 is configured by frosted glass. Other material can also be used as the material for the sample stage 13. However, in a case where transparency of the sample stage 13 is at a predetermined level or higher (that is, in a case where the sample stage 13 is transparent), the predetermined pattern projected from the pattern projection apparatus 18 may pass through the sample stage 13. Accordingly, the sample stage 13 preferably is of a material having a low level of transparency such that the predetermined pattern does not pass through the material.

As shown in FIG. 1, the computer system 2 includes a computer main body 21, a keyboard 22, a mouse 23, and a display 24. This system, which is based around the computer main body 21, may be configured as shown in FIG. 2, for example. Specifically, an image signal for the measured object 100 captured by the image capture apparatus 16 is converted into multi-value image data by an AD converter 31 and is stored in a multi-value image memory 32 (image memory). The multi-value image data stored in the multi-value image memory 32 is displayed on the display 24 due to operations by a display controller 33. Meanwhile, an operator's command input using the keyboard 22 and mouse 23 is transmitted to a CPU 35 via an interface (I/F) 34. The CPU 35 executes various processes, such as stage displacement, according to the operator's command or a program stored in a program memory 36. A working memory 37 provides a work space for the various processes of the CPU 35.

In addition, an X-axis encoder 41 and Z-axis encoder 43 detecting an X-axis direction position and Z-axis direction position of the image capture apparatus 16, respectively, as well as a Y-axis encoder 42 detecting a Y-axis direction position of the table 13 are provided, and output from each of the encoders 41 to 43 is fed to the CPU 35. Based on received data for each axis position and on the command from the operator, the CPU 35 drives the image capture apparatus 16 in the X-axis and Z-axis directions via an X-axis drive system 44 and a Z-axis drive system 46, and drives the table 13 in the Y-axis direction via a Y-axis drive system 45. Thereby, a stage displacement operation can be achieved. Moreover, an illumination controller 39 generates an analog quantity command voltage and applies the voltage to the illumination device 17 based on a command value generated by the CPU 35.

Figure 3:
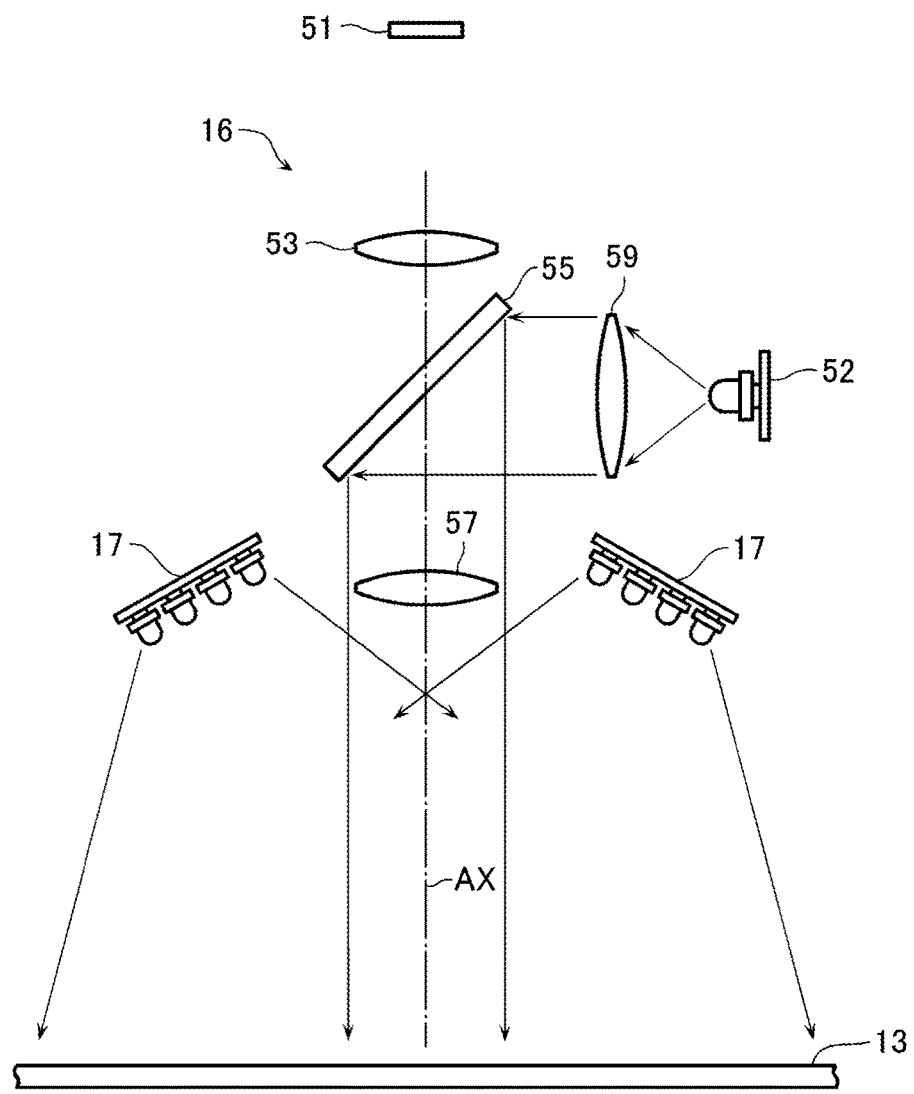
FIG. 3 is a schematic diagram illustrating a configuration of an image capture apparatus and an illumination device according to the first embodiment.

Next, with reference to FIG. 3, a configuration is described for the image capture apparatus 16 and the illumination device 17 of the image measuring apparatus 1 according to the first embodiment. FIG. 3 is a schematic diagram illustrating a configuration of the image capture apparatus 16 and the illumination device 17. The image capture apparatus 16 includes a photoreceiver element 51 arranged so as to face the sample stage 13. An image capture lens 53, a half mirror 55, and an objective lens 57 are arranged on an optical axis AX of the photoreceiver element 51.

The illumination device 17 is arranged around a circumference of the objective lens 57. The illumination device 17 emits light onto the sample stage 13 from an oblique direction. In addition, an epi-illumination device 52 is arranged to a side of the half mirror 55, the epi-illumination device 52 emitting light onto the measured object 100 via a collimator lens 59. The epi-illumination device 52 emits light onto the sample stage 13 via the half mirror 55.

Figure 4:
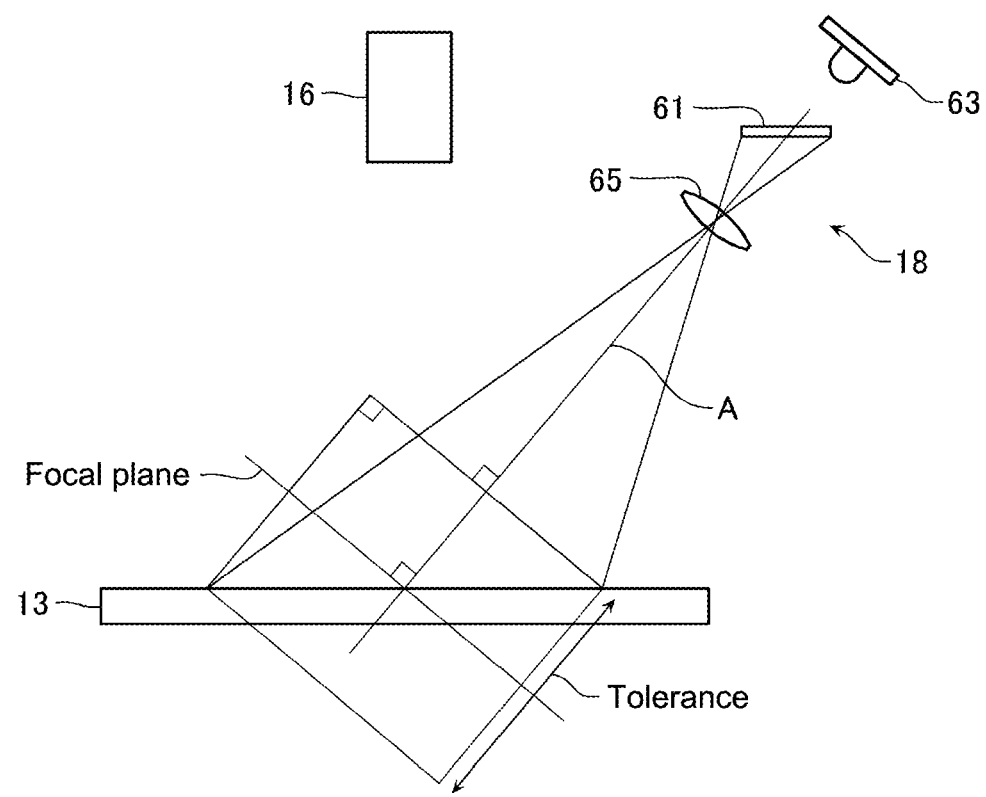
FIG. 4 is a schematic diagram illustrating a configuration of a pattern projection apparatus according to the first embodiment.
Figure 5:
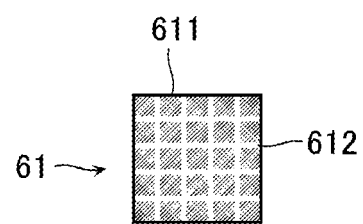
FIG. 5 is a schematic diagram illustrating a configuration of a mask of the pattern projection apparatus according to the first embodiment.
Figure 6:
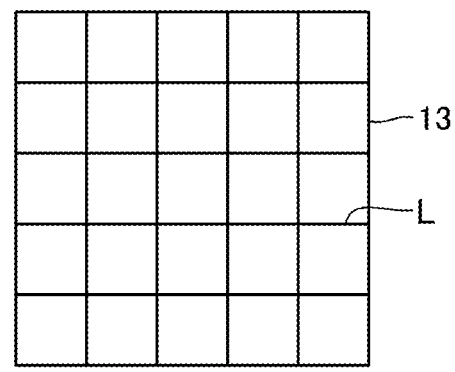
FIG. 6 is a schematic diagram illustrating an appearance of a sample stage during projection of a pattern according to the first embodiment.

Next, with reference to FIGS. 4 to 6, a configuration is described for the pattern projection apparatus 18 of the image measuring apparatus 1 according to the present embodiment. FIG. 4 is a schematic diagram illustrating a configuration of the pattern projection apparatus 18. FIG. 5 is a schematic diagram illustrating a configuration of a mask 61 of the pattern projection apparatus 18. FIG. 6 is a schematic diagram illustrating an appearance of the sample stage 13 when the pattern L is projected onto the sample stage 13.

As shown in FIG. 4, the pattern projection apparatus 18 according to the present embodiment includes the mask 61, which displays the predetermined pattern; a light source 63, which emits light onto the mask 61; and a projection lens 65, which is a projection optical system projecting the light emitted from the light source 63 and through the mask 61 onto the sample stage 13. The projection lens 65 preferably uses a wide angle lens having a large depth of field. In addition, in a case where the mask 61 is arranged so as to be perpendicular with respect to the optical axis of the light from the light source 63, a keystone corrector is preferably provided in addition to the projection lens 65 (projection optical system).

Furthermore, as shown in FIG. 4, in the present embodiment, by installing the mask 61 to be generally parallel to the sample stage 13, the keystone corrector becomes unnecessary. In addition, an optical axis A of the projection lens 65 passes through approximately a center portion of the mask 61 and the sample stage 13. Accordingly, trapezoidal distortion of the pattern projected onto the placement surface of the sample stage 13 is kept to a minimum.

As shown in FIG. 5, in the present embodiment, the mask 61 includes a shield portion 611 through which light does not pass and a transparent portion 612 through which light passes, the transparent portion 612 being provided so as to follow the shape of the predetermined pattern. As shown in FIG. 6, the predetermined pattern L is projected onto the sample stage 13 so as to follow the shape of the transparent portion 612 of the mask 61. In the present embodiment, the predetermined pattern L is a mesh-like pattern configured by a plurality of vertical lines arranged at equal intervals and a plurality of horizontal lines arranged at equal intervals, the horizontal lines intersecting with the vertical lines.

In the present embodiment, a light source emitting a halogen laser is used as the light source 63. However, various kinds of light sources can be employed as the light source 63. In addition, in the present embodiment, the projection lens 65 uses a lens having a substantial focal depth in which the predetermined pattern L on the sample stage 13 does not blur beyond a predetermined amount.

Figure 7:
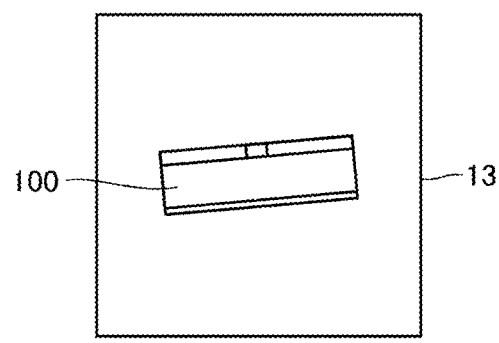
FIG. 7 is a schematic plan view illustrating an appearance during alignment of a measured object on an image measuring apparatus according to a comparative example.
Figure 8:
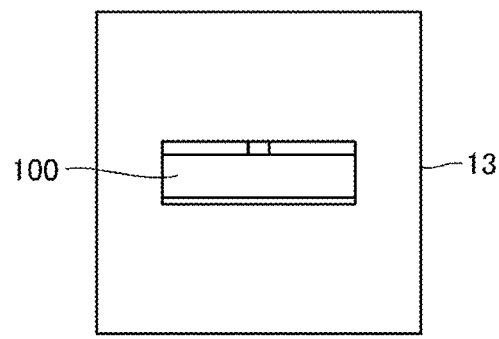
FIG. 8 is another schematic plan view illustrating the appearance of the alignment.

Alignment of Measured Object on Image Measuring Apparatus in Comparative Example Next, alignment of the measured object 100 on an image measuring apparatus according to a comparative example is described with reference to FIGS. 7 and 8. FIGS. 7 and 8 are schematic plan views illustrating the appearance of the alignment. The image measuring apparatus according to the comparative example has a basic configuration similar to that of the image measuring apparatus according to the embodiment, except that the image measuring apparatus according to the comparative example does not include the pattern projection apparatus 18.

In order to perform highly accurate image measurement, it is extremely important to accurately position the measured object 100, and so as to be parallel, with respect to a reference axis of the placement surface of the sample stage 13. Accordingly, as shown in FIG. 7, from a state where a placement direction of the measured object 100 is crooked with respect to the sample stage 13, or the position is offset from a desired position, the measured object 100 is preferably positioned or the parallelism thereof is corrected and, as shown in FIG. 8, a position and direction of the measured object 100 on the placement surface of the sample stage 13 is preferably adjusted. However, positioning the measured object 100 on the placement surface or correcting the parallelism of the measured object 100 requires experience. In addition, in some cases, when the measured object 100 is positioned or the parallelism corrected, a number of steps before performing measurement has increased.

Alignment of Measured Object on Image Measuring Apparatus in Embodiment

Figure 9:
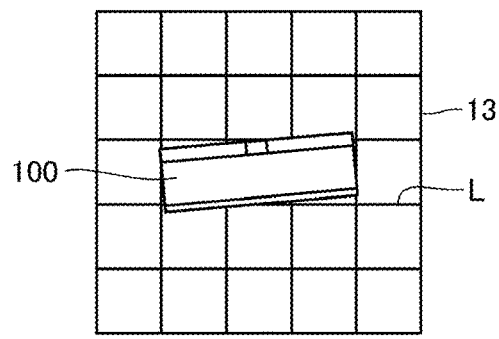
FIG. 9 is a schematic plan view illustrating an appearance during alignment of the measured object on the image measuring apparatus according to the first embodiment.
Figure 10:
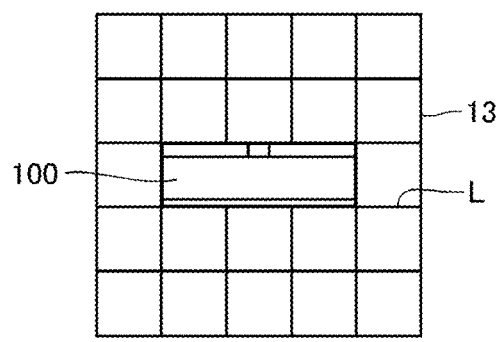
FIG. 10 is another schematic plan view illustrating the appearance of the alignment.

Next, alignment of the measured object 100 on the image measuring apparatus according to the present embodiment is described with reference to FIGS. 9 and 10. FIGS. 9 and 10 are schematic plan views illustrating the appearance of the alignment.

As shown in FIG. 9, in the present embodiment, when positioning or correcting parallelism of the measured object 100, the predetermined pattern L is projected onto the placement surface of the sample stage 13, the predetermined pattern L providing a reference for at least one of the position and direction of the measured object 100. Accordingly, by adjusting at least one of the placement position and direction of the measured object 100 with reference to the predetermined pattern L, positioning and correcting parallelism of the measured object 100 can be readily performed. For example, in the present embodiment, the predetermined pattern L is the mesh-like pattern configured by the plurality of vertical lines arranged at equal intervals and the plurality of horizontal lines arranged at equal intervals, the horizontal lines intersecting with the vertical lines. Therefore, as shown in FIG. 10, by placing the measured object 100 so as to match up with the vertical and horizontal lines, the measured object 100 can be readily positioned and parallelism corrected.

In addition, in the present embodiment, when positioning and correcting parallelism of the measured object 100, the predetermined pattern L can be projected onto the placement surface of the sample stage 13 by turning on the light source 63 (FIG. 4) of the pattern projection apparatus 18, then after the positioning and parallelism correction is completed, the projection of the predetermined pattern L can be stopped by turning off the light source 63 (FIG. 4) of the pattern projection apparatus 18. Accordingly, when measuring an image, the pattern L can be removed from the sample stage 13. Therefore, in a case where edge detection of the measured object is performed based on an image captured by the image capture apparatus 16, as well as in a case where contrast-type autofocus is performed, there is no effect on the measurement. Moreover, the technology according to the present embodiment can be applied to measuring apparatuses other than an image measuring apparatus. In a case where the technology is applied to a coordinate measuring apparatus using a laser probe, or to a white interferometer, for example, an effect on the measurement can be eliminated by removing the pattern L from the sample stage 13 when measuring an image.

Moreover, as shown in FIG. 4, the pattern projection apparatus 18 according to the present embodiment includes the mask 61, which displays the predetermined pattern; the light source 63, which emits light onto the mask 61; and the projection lens 65, which projects the light emitted from the light source 63 and through the mask 61 onto the sample stage 13. According to this configuration, by switching the mask 61, for example, a different pattern can be projected onto the sample stage 13 according to the shape, size, or the like of the measured object 100.

Figure 11:
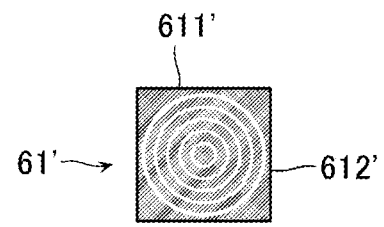
FIG. 11 is a schematic diagram illustrating a configuration of a mask according to a different configuration.
Figure 12:
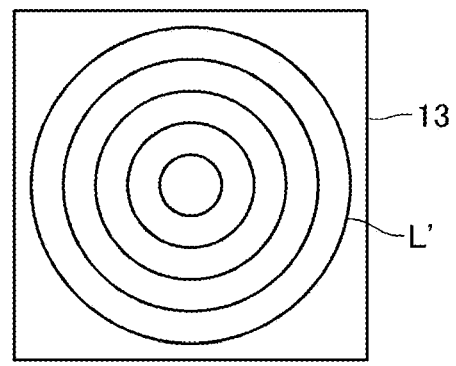
FIG. 12 is a schematic diagram illustrating an appearance of the sample stage during projection of a different pattern.

For example, a case may be considered where, as shown in FIGS. 11 and 12, when the measured object 100 has a disk or cylinder shape in which a planar shape or base shape of the measured object 100 is circular, a mask 61' may be used that is capable of projecting a pattern L', which is different from the pattern L described with reference to FIGS. 5 and 6. As shown in FIG. 12, the pattern L' is configured by a plurality of circles having an identical center position and different diameters. The diameters of the plurality of circles increase in size at a predetermined interval.

Moreover, in a case where the measured object 100 has a complex shape, a pattern can also be formed to match the planar shape or base shape of the measured object 100. For example, when the measured object 100 is a gear wheel, a line drawing having the same shape as the outline of the gear wheel may be projected as the predetermined pattern; or the measured object 100 may first be placed on the sample stage 13, an image of the measured object 100 may be captured, and this image may be projected as the predetermined pattern.

In addition, the present embodiment may be configured such that the color or intensity (illuminance) of the light emitted from the light source 63 of the pattern projection apparatus 18 can be adjusted. As a result, for example, a color can be used that is favorable in view of a surface color of the measured object 100, or the illuminance may be favorably adjusted in view of reflectance of the surface of the measured object 100, thereby more favorably enabling the positioning and parallelism correction of the measured object 100.

In addition, in the present embodiment, the pattern projection apparatus 18 is positioned not on a rear side of the sample stage 13 (opposite side from the placement surface), but rather on the placement surface side of the sample stage 13. Accordingly, dead space in a vicinity of the image capture apparatus 16 can be effectively utilized, and the overall image measuring apparatus 1 can be configured compactly. In addition, in the present embodiment, the image capture direction of the image capture apparatus 16 is generally perpendicular with respect to the placement surface of the sample stage 13, and the pattern projection apparatus 18 projects the predetermined pattern from a direction other than the image capture direction of the image capture apparatus 16. In other words, the predetermined pattern is projected from obliquely above the sample stage 13. Accordingly, the predetermined pattern can be projected even onto portions on a boundary between the placement surface of the sample stage 13 and a side surface of the measured object 100, and positioning and parallelism correction of the measured object 100 can be performed with still more accuracy.

Figure 13:
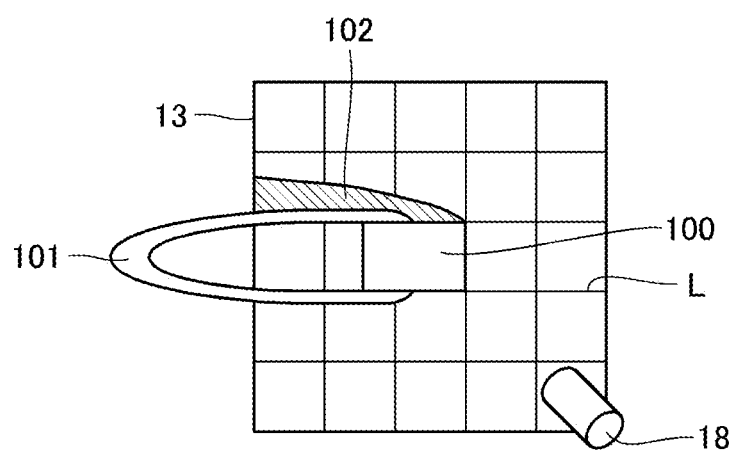
FIG. 13 is a schematic plan view illustrating the appearance during alignment of the measured object on the image measuring apparatus according to the first embodiment.

Moreover, as shown in FIG. 13, in the present embodiment, the predetermined pattern L is projected from a near side toward a far side of the sample stage 13. Therefore, a shadow 102 of a sample 100 or tweezers 101 is cast not on the near side of the sample 100 or tweezers 101, but instead on the far side. Accordingly, an effect of the shadow 102 can be eliminated and alignment of the sample 100 can be still more favorably performed.

Moreover, the position of the pattern projection apparatus 18, the direction in which the predetermined pattern is projected, and the like can be changed as appropriate. In addition, the pattern projection apparatus 18 may be configured so as to be movable with respect to the sample stage 13, the image capture apparatus 16, and the like. Furthermore, two or more pattern projection apparatuses 18 may be provided.

Second Embodiment

Figure 14:
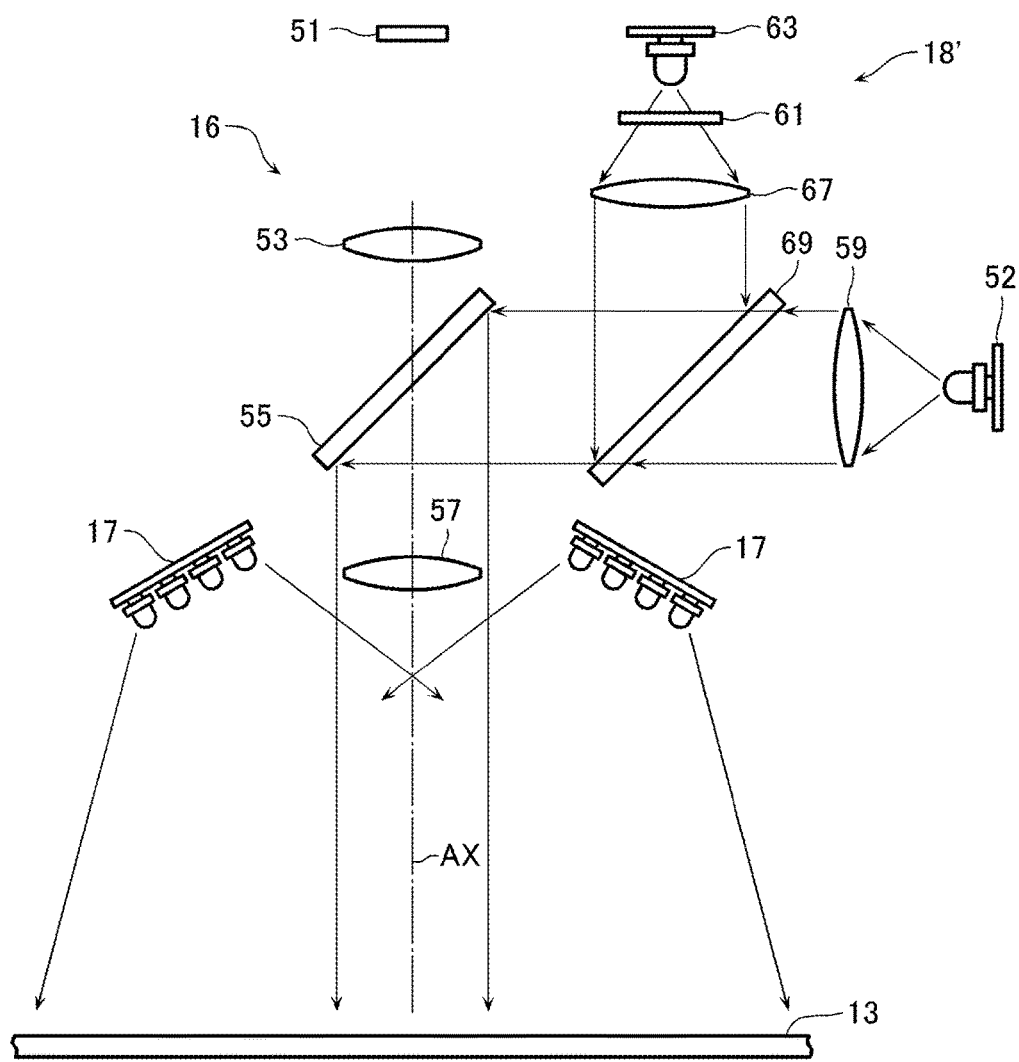
FIG. 14 is a schematic diagram illustrating a configuration of a portion of an image measuring apparatus according to a second embodiment.

Next, an image measuring apparatus according to a second embodiment is described with reference to FIG. 14. FIG. 14 is a schematic diagram illustrating a configuration of a portion of the image measuring apparatus according to the second embodiment. In the following description, configurations shared with the first embodiment are assigned the same reference numerals as in the first embodiment, and descriptions thereof are omitted.

In the first embodiment, the image capture apparatus 16 and the pattern projection apparatus 18 are configured independently. In contrast, in the second embodiment, a pattern projection apparatus 18' and a portion of an optical system of the image capture apparatus 16 are configured to be shared. Further, in the first embodiment, the predetermined pattern is projected from a direction other than the image capture direction of the image capture apparatus 16. In contrast, in the second embodiment, the predetermined pattern is projected from the same general direction as the image capture direction of the image capture apparatus 16.

Specifically, as shown in FIG. 14, the pattern projection apparatus 18' according to the present embodiment includes, in addition to the mask 61 and the light source 63 emitting light at the mask 61, a collimator lens 67 and a half mirror 69. The half mirror 69 is arranged between the collimator lens 59 and the half mirror 55. The light emitted from the light source 63 and through the mask 61 is emitted onto the half mirror 69 via the collimator lens 67 and combines at the half mirror 69 with light emitted from the epi-illumination device 52. In addition, in the present embodiment, the objective lens 57 also acts as a projection lens of the pattern projection apparatus 18'.

In the image measuring apparatus according to the present embodiment, the predetermined pattern is projected from a direction generally perpendicular to the sample stage 13. Therefore, keystone correction of the predetermined pattern can be omitted and the configuration of the optical system can be simplified.

In the present embodiment, as shown in FIG. 14, the light emitted from the light source 63 and through the mask 61 was combined at the half mirror 69 with the light emitted from the epi-illumination device 52. However, the mask 61 may also be placed directly between the epi-illumination device 52 and the collimator lens 59, or between the collimator lens 59 and the half mirror 55, for example. Such a configuration has comparatively few components, and therefore can be manufactured at a low cost. In such a case, the epi-illumination device 52 also acts as a light source of a pattern projection apparatus.

Third Embodiment

Figure 15:
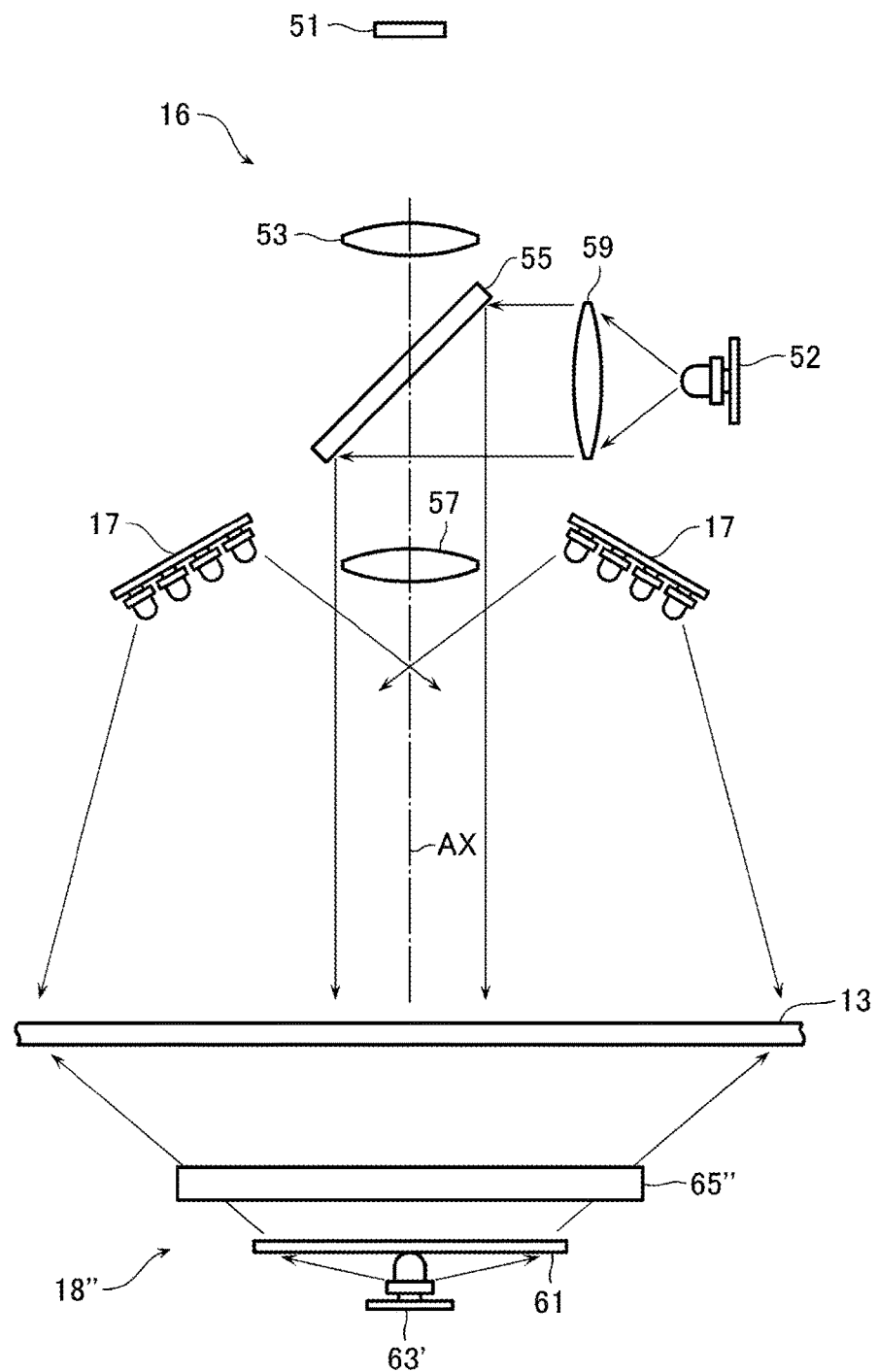
FIG. 15 is a schematic diagram illustrating a configuration of a portion of an image measuring apparatus according to a third embodiment.

Next, an image measuring apparatus according to a third embodiment is described with reference to FIG. 15. FIG. 15 is a schematic diagram illustrating a configuration of a portion of the image measuring apparatus according to the third embodiment. In the following description, configurations shared with the first embodiment are assigned the same reference numerals as in the first embodiment, and descriptions thereof are omitted.

In the first embodiment, the pattern projection apparatus 18 is positioned not on the rear side of the sample stage 13 (opposite side from the placement surface), but rather on the placement surface side of the sample stage 13. In contrast, a pattern projection apparatus 18" according to the present embodiment is positioned on the rear side of the sample stage 13 (opposite side from the placement surface). In addition, the pattern projection apparatus 18" according to the present embodiment projects the predetermined pattern onto the sample stage 13 from the rear side of the sample stage 13. Accordingly, positioning and parallelism correction of the measured object 100 can be favorably performed without a portion of the projected pattern being blocked by the measured object 100, tweezers, or the like.

Fourth Embodiment

Figure 16:
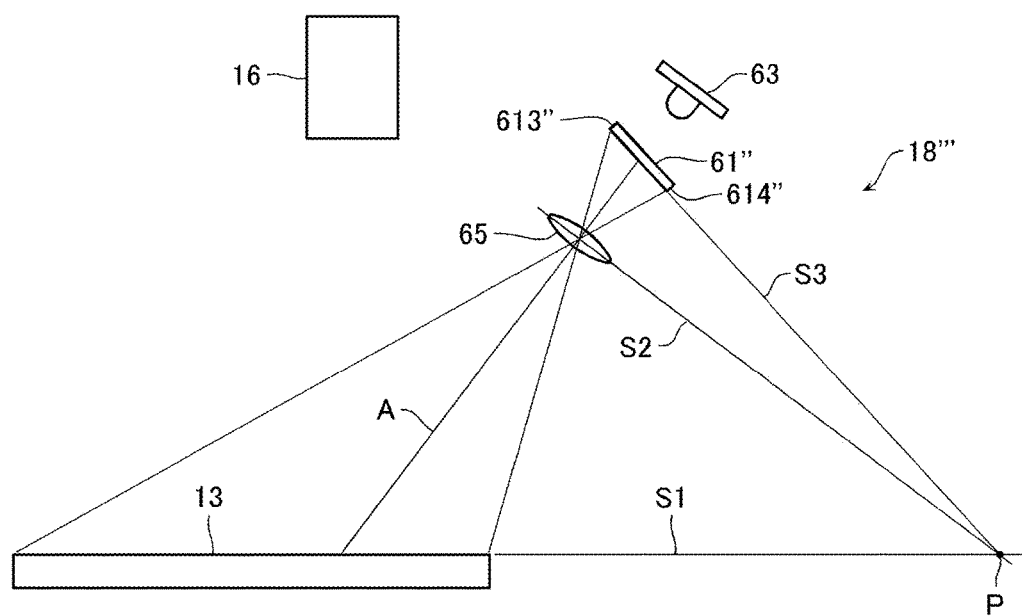
FIG. 16 is a schematic diagram illustrating a configuration of a portion of an image measuring apparatus according to a fourth embodiment.
Figure 17:
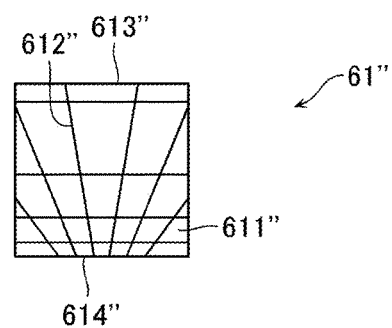
FIG. 17 is a schematic diagram illustrating a configuration of a mask of a pattern projection apparatus according to the fourth embodiment.

Next, an image measuring apparatus according to a fourth embodiment is described with reference to FIGS. 16 and 17. FIG. 16 is a schematic diagram illustrating a configuration of a portion of the image measuring apparatus according to the fourth embodiment. FIG. 17 is a schematic diagram illustrating a configuration of a mask 61" of a pattern projection apparatus 18'''. In the following description, configurations shared with the first embodiment are assigned the same reference numerals as in the first embodiment, and descriptions thereof are omitted.

In the pattern projection apparatus 18 according to the first embodiment, the mask 61 is installed generally parallel with the sample stage 13, and the optical axis A of the projection lens 65 passes through approximately the center portion of the mask 61 and the sample stage 13. In contrast, as shown in FIG. 16, in the pattern projection apparatus 18''' according to the present embodiment, a plane S1 overlapping with the placement surface of the sample stage 13 is perpendicular to the optical axis A of the projection lens 65, and a plane S2 running through a center of the projection lens 65 and a plane S3 overlapping with the mask 61" intersect at a straight line represented by a point P in FIG. 16.

In a case where such a configuration is employed for the pattern projection apparatus 18''', the predetermined pattern can be favorably projected onto the sample stage 13 using the Scheimpflug principle. In addition, in the present embodiment, a projection lens having a comparatively shallow focal depth can also be used as the projection lens 65.

Further, in the pattern projection apparatus 18''' according to the present embodiment, trapezoidal distortion is greater than in the pattern projection apparatus 18 according to the first embodiment. Accordingly, as shown in FIG. 17, a shape of a transparent portion 612" of the mask 61" according to the present embodiment is distorted ahead of time so as to cancel out the distortion of the pattern projected onto the sample stage 13. In other words, the shape of the transparent portion 612" of the mask 61" shows a pattern that expands as it approaches an end portion 613" (top end in FIG. 17) where the pattern is projected at a comparatively large size, and shows a pattern than constricts as it approaches an end portion 614" (bottom end in FIG. 17) where the pattern is projected at a comparatively small size.

OTHER EMBODIMENTS

The pattern projection apparatuses 18, 18', 18", and 18''' according to the first to fourth embodiments include the mask 61, which displays the predetermined pattern. However, a pattern generating device such as an LCD (Liquid Crystal Display) or DMD (Digital Mirror Device) generating the predetermined pattern based on input image data can also be used instead of the mask 61. In such a case, for example, an image generated by the pattern generating device can be adjusted ahead of time using a digital method and thus distortion such as trapezoidal distortion arising in the optical system can be corrected.

In addition, the technology according to the first to fourth embodiments can be applied to measuring apparatuses other than an image measuring apparatus. For example, the technology can be applied to various measuring apparatuses having a sample stage, such as contact-type coordinate measuring apparatus using a touch probe, a non-contact-type coordinate measuring apparatus using a laser probe, a white interferometer, a microscope, or the like. Moreover, a conveyor belt-type device can also be employed as the sample stage.

The configuration of the optical system, such as the pattern projection apparatus, can also be modified as appropriate. For example, lenses correcting various kinds of distortion can be employed, or a shift lens or the like can be employed. Moreover, the pattern of the mask 61 can be distorted ahead of time in consideration of various kinds of distortion occurring in the optical system, and thus distortion of the projected pattern can be corrected.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An image measuring apparatus comprising:
   a sample stage having a placement surface on which an object to be measured is to be placed;
   an imager facing the placement surface of the sample stage and configured to capture an image of the object to be measured;
   a pattern projector configured to project a predetermined pattern onto the sample stage, the predetermined pattern providing a reference for at least one of a placement position and a direction of the object to be measured on the placement surface, wherein the pattern projector comprises:
      a mask configured to display the predetermined pattern, the mask including a shield and a transparent section;
      a light source configured to emit light onto the mask such that the emitted light does not pass through the shield, and such that that the emitted light can pass through the transparent section; and
      a projection optical system configured to project the emitted light through the mask onto the sample stage; and
   an adjuster that provides for the adjustment of at least one of the color and intensity of the light projected from the pattern projector, according to reflectance of the measured object.

2. The image measuring apparatus according to claim 1, wherein the pattern projector further comprises a keystone corrector configured to perform keystone correction of the predetermined pattern projected onto the placement surface.

3. The image measuring apparatus according to claim 1, wherein the mask is positioned so as to be generally parallel to the placement surface.

4. The image measuring apparatus according to claim 1, wherein:
   an image capture direction of the imager is generally perpendicular with respect to the placement surface of the sample stage, and
   the pattern projector is positioned on the same side of the sample stage as the placement surface and is configured to project the predetermined pattern onto the sample stage from a direction other than the image capture direction of the imager.

5. The image measuring apparatus according to claim 1, wherein:
   an image capture direction of the imager is generally perpendicular with respect to the placement surface of the sample stage, and
   the pattern projector is positioned on the same side of the sample stage as the placement surface and is configured to project the predetermined pattern from generally the same direction as the image capture direction of the imager.

6. The image measuring apparatus according to claim 1, wherein the pattern projector is positioned on an opposite side of the sample stage from the placement surface side, and is configured to project the predetermined pattern onto the sample stage from an opposite side surface of the sample stage.

7. A measuring apparatus comprising:
   a sample stage having a placement surface on which an object to be measured is to be placed;

a measurer configured to measure a shape of the object to be measured placed on the placement surface of the sample stage; and a pattern projector configured to project a predetermined pattern onto the sample stage, the predetermined pattern further configured to provide a reference for at least one of a placement position and a direction of the object to be measured on the placement surface, wherein the pattern projector comprises:

a mask configured to display the predetermined pattern, the mask including a shield and a transparent section;

a light source configured to emit light onto the mask such that the emitted light does not pass through the shield, and such that that the emitted light can pass through the transparent section; and a projection optical system configured to project the emitted light through the mask onto the sample stage; and an adjuster that provides for the adjustment of at least one of the color and intensity of the light projected from the pattern projector, according to reflectance of the measured object.

8. The image measuring apparatus according to claim 1, wherein the pattern projector is mounted to the imager.

9. The image measuring apparatus according to claim 1, wherein the mask is perpendicular with respect to an optical axis of the light source.

10. The image measuring apparatus according to claim 7, wherein the pattern projector is mounted to the imager.

11. The image measuring apparatus according to claim 7, wherein the mask is perpendicular with respect to an optical axis of the light source.

12. An image measuring apparatus comprising:

a sample stage having a placement surface on which an object to be measured is to be placed;

an imager facing the placement surface of the sample stage and configured to capture an image of the object to be measured;

pattern projector configured to project a predetermined pattern onto the sample stage, the predetermined pattern providing a reference for at least one of a placement position and a direction of the object to be measured on the placement surface, wherein the pattern projector comprises:

a pattern generator configured to generate the predetermined pattern based on input image data;

a light source configured to emit the light onto the pattern generator; and a projection optical system configured to project the light emitted from the light source and through the pattern generator onto the sample stage; and an adjuster that provides for the adjustment of at least one of the color and intensity of the light projected from the pattern projector, according to reflectance of the measured object.

13. The image measuring apparatus according to claim 12, wherein the pattern projector is mounted to the imager.

* * * * *